Oct. 6, 1953  H. R. ADCOCK  2,654,270
AUTOMATIC DRILLING MECHANISM
Filed June 12, 1950  4 Sheets-Sheet 1
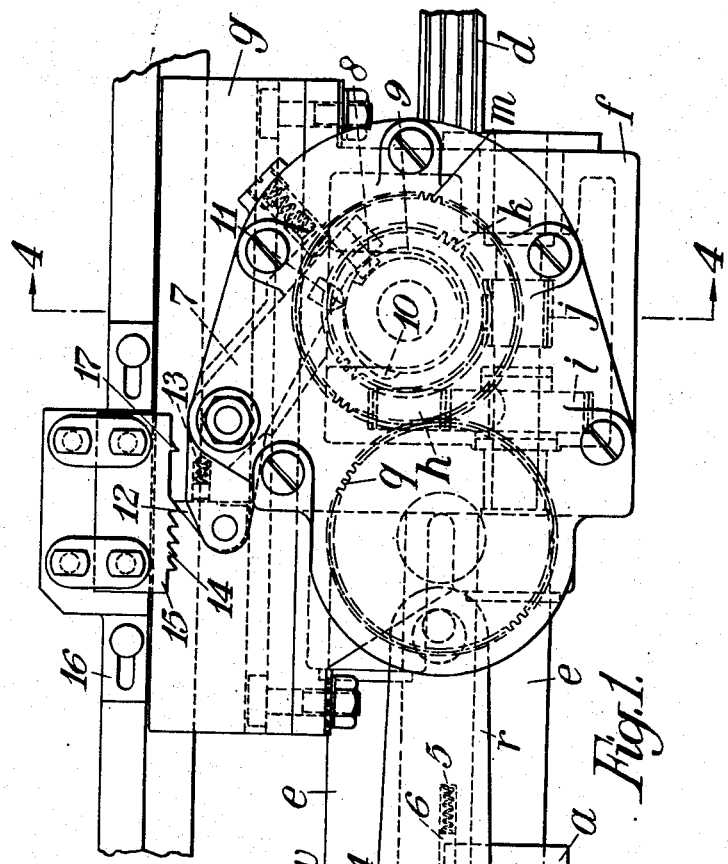
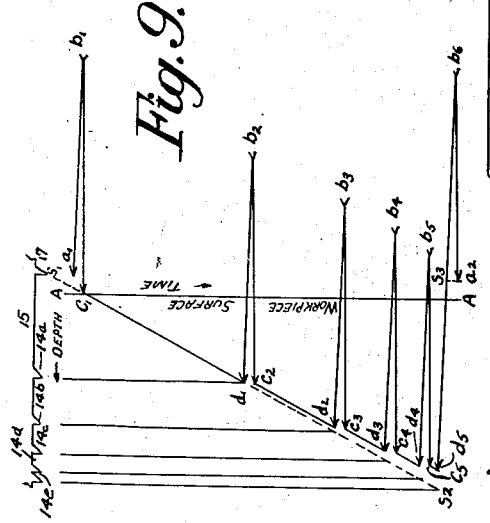
Inventor
H. R. Adcock

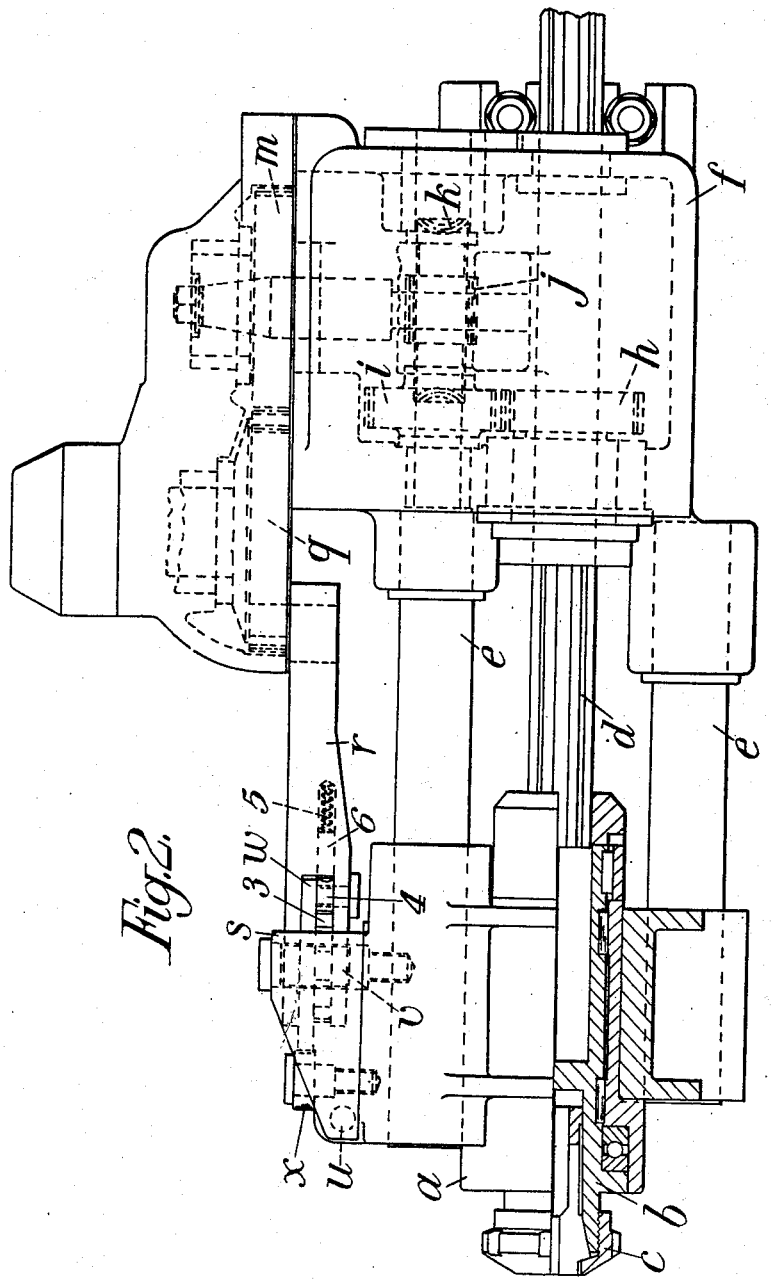

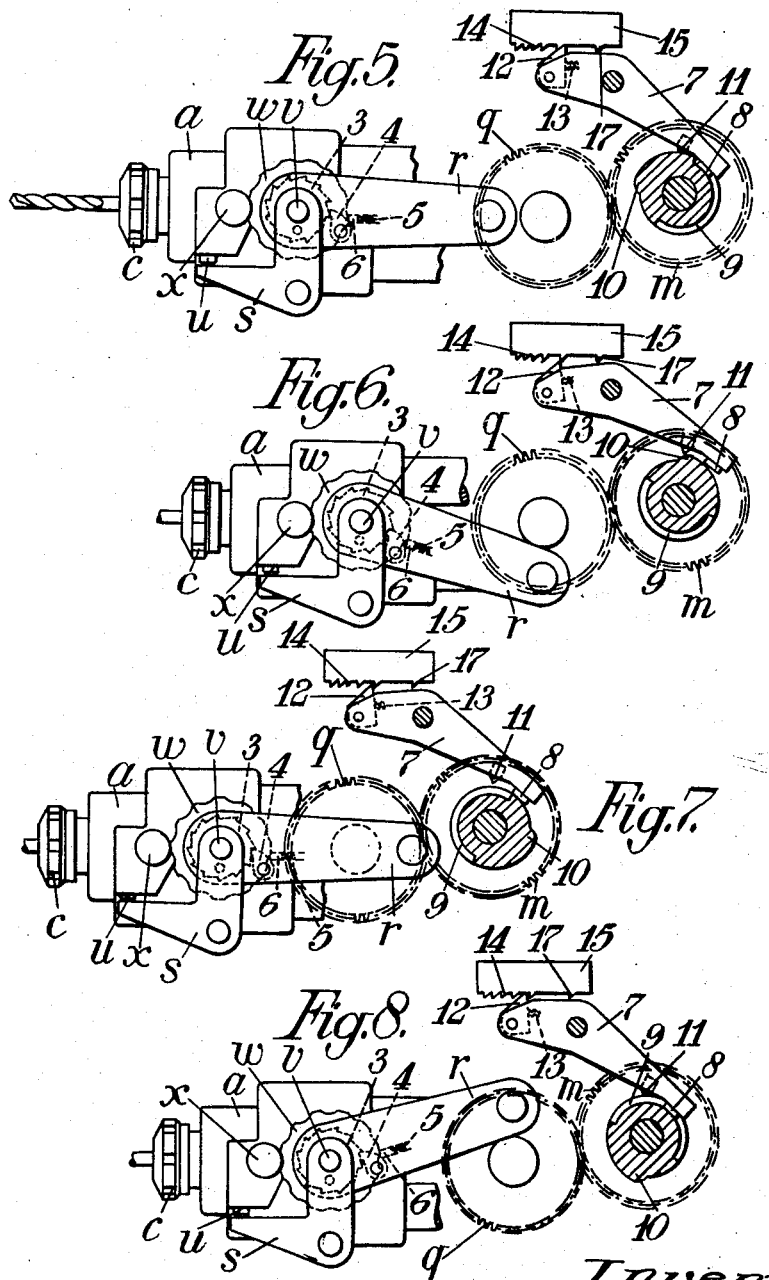

Patented Oct. 6, 1953

2,654,270

UNITED STATES PATENT OFFICE 2,654,270

AUTOMATIC DRILLING MECHANISM

Horace Ray Adcock, Shirley, Birmingham, England, assignor to A. C. Wickman Limited, Tile Hill, Coventry, England Application June 12, 1950, Serial No. 167,656
In Great Britain June 22, 1949

7 Claims. (Cl. 77—32.3)

In the drilling of work pieces it is usually necessary to withdraw the drill from the work piece intermittently for the removal of cuttings and the application of a liquid coolant, when the ratio of the hole length/diameter exceeds a certain amount, and mechanisms for effecting such action automatically are incorporated in or adapted to be attached to such machine tools as automatic lathes.

It will be appreciated that the necessity for intermittently withdrawing the drill when operating on a given work piece involves a loss of time, and in the mass production of some types of work pieces, this loss in the aggregate adds substantially to the cost of production.

The present invention is particularly concerned with solving the problem of effecting such relief drilling whilst applying a continuous working feed to the drilling unit. Such continuous feed motions are imparted to the tool slides of automatic lathes (multi- and single spindle) and like machines, during their working stroke.

It is an object of this invention to provide an automatic drilling unit for mounting upon such a tool slide whereby the working feed applied to the drill is derived from the feedslide movement and there are superimposed by the unit intermittent reciprocatory relieving movements of the drill. During such relieving movements the drill point is retracted by a distance from the open end of the hole sufficient to clear a workpiece being drilled and returned to an operative position by advancing the drill by a distance equal to the distance through which it was retracted less the distance through which the unit has been fed bodily by the machine tool slide during the retraction and return of the drill.

The invention comprises an automatic drilling unit for mounting upon a tool slide of a machine to which slide continuous uniform uninterrupted feed motion is imparted during the entire drilling operation, comprising in combination a support for a slidably mounted drill holder, mechanism for effecting intermittent reciprocating movements of the drill holder to retract the drill holder from and return it to an operative drilling position, tripping means for initiating successive reciprocatory movements, means operable by said mechanism for varying the operative position of the drill holder to nullify the feed increment imparted by the tool slide during each reciprocation, there being provided upon the machine frame a plurality of stationary means spaced in the direction of feed for intermittently co-operating with said tripping means.

In the accompanying drawings:

Figure 1 is a side elevation of a mechanism embodying the invention.

Figure 2 is a part sectional inverted plan.

Figures 5-8 are diagrams illustrating successive stages in the action of the mechanism.

Figure 9 shows diagrammatically with respect to time, a complete cycle of the relative positions of a feed-slide and drill point, and the successive positions of the slide where the mechanism thereon is moved past and is tripped by the stationary tappet piece.

Figure 3:
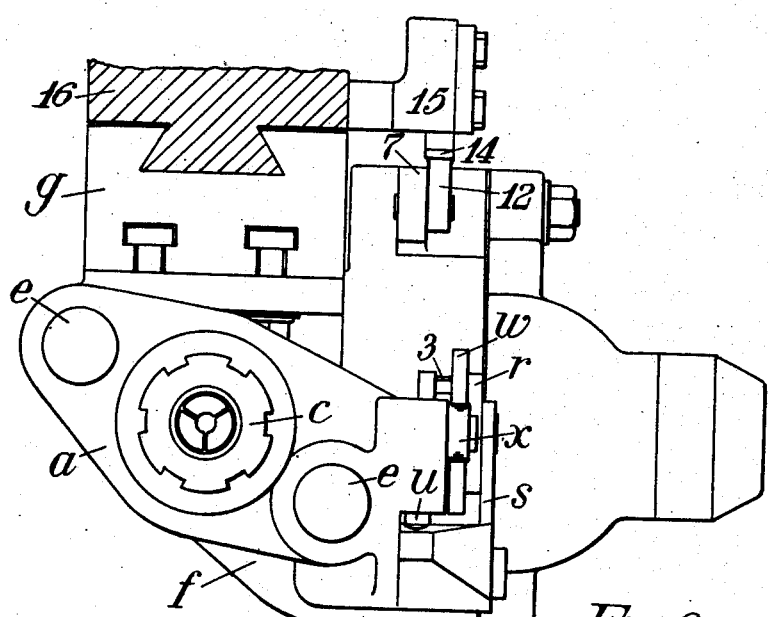
Figure 3 is an end view of the forward end of the mechanism.
Figure 4:
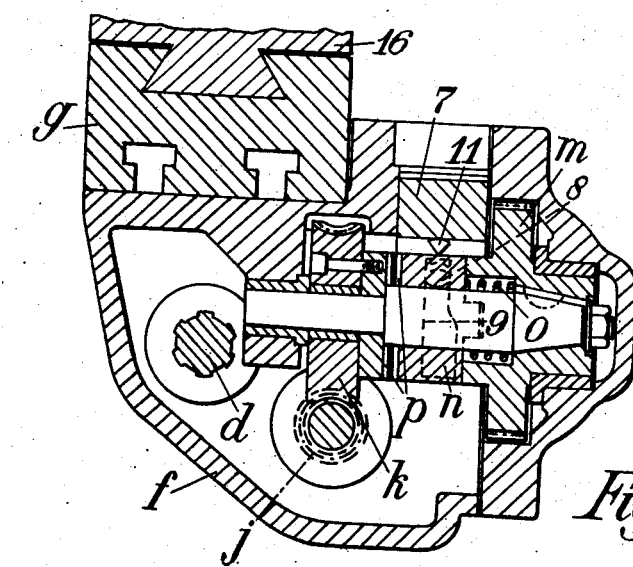
Figure 4 is a cross section on the line 4—4, Figure 1.

Referring to the drawings, there is provided a drill slide $a$ which carries a hollow spindle $b$ in the forward end of which is mounted a drill chuck $c$. The rear end of the spindle is adapted to effect a slidable spline connection with a rotary drill-driving spindle $d$ forming part of an automatic (single or multi-spindle) lathe. The slide $a$ in one convenient form is reciprocably mounted on a pair of parallel guide bars $e$ secured to a gear box $f$ through which extends the drill-driving spindle $d$ and which is adapted to be mounted on a feed slide $g$ (Figures 3 and 4) of the lathe. The slide $g$ executes a continuous uniform feed movement (leftward in Figure 1). The spindle $d$ drives a pinion $h$ in the box, and this pinion engages another pinion $i$ which actuates a worm $j$ and worm wheel $k$. The worm wheel $k$ drives a pinion $m$ through a dog clutch member $n$ loaded by a spring $o$, the member $n$ being in engagement at one end with the wheel $m$ and being engageable at the other end with the worm wheel $k$ through ratchet-like teeth $p$ formed on the parts $k$, $n$. The pinion $m$ engages and imparts motion to the toothed periphery of a crank disc $q$.

The crank disc $q$ imparts reciprocatory movements to the drill slide $a$ through a connecting rod $r$, and to nullify the effect of the continuous movement of the feed slide $g$ on the drill position while the drill is being retracted from and returned to the work piece, one end of the connecting rod is connected to one end of a bell crank lever $s$ which is pivoted at its elbow on the drill slide $a$, the other end of this lever being loaded by a spring $t$ through a plunger $u$ carried by the said slide. On the end of the lever to which the connecting rod is attached, there is arranged coaxially with the pivot $v$ by which the connecting rod is attached to the lever, a compensating cam $w$ the periphery of which bears against an abutment $x$ on the drill slide. The reciprocatory movements are therefore imparted to the drill slide from the connecting rod through the lever $s$, cam $w$ and abutment $x$. Around each half of the periphery of the cam are formed a series of notches of progressively varying depth and the abutment $x$ is shaped to occupy each recess in turn, so that the distance between the drill slide and the crank axis can be progressively reduced during the drilling operation. Coaxially with and secured to one side of the cam is a ratchet wheel 3 which is engaged by a pawl 4 loaded by a spring 5 through a plunger 6 on the connecting rod. The arrangement is such that during each rotation of the crank the cam is moved through an angular distance corresponding to the pitch of the cam recesses. Movement of the cam from one position to the next enables the drill slide, under the action of the spring acting on the bell crank lever to recede by an amount equal to that by which the feed slide has advanced while the drill is being withdrawn and returned. The unit is mounted upon the machine tool slide in such a position relative to the end of a workpiece, that in the drilling position of the unit (that is with the parts as shown in Figure 1), the distance from the workpiece to the drill point is initially small, and upon retraction of the drill by rotation of the crank disc through 180° as later explained in detail, this distance will be a maximum. When the depth of a hole being drilled in the workpiece approaches the distance through which the drill is retracted by a 180° rotation of the crank disc from the position shown in Figure 1, the drill point will only slightly clear the end of the workpiece when the drill is fully retracted.

It will be understood that while the drill is cutting, the crank mechanism is out of action, and the drill is fed forward into the work piece by the action of the feed slide $g$. But after the drill has penetrated the work piece to a predetermined depth the crank mechanism is set in motion for withdrawing the drill and subsequently returning it to the work piece. To effect the automatic control of the clutch through which the crank mechanism is actuated, there is mounted in the gear box above mentioned a lever 7 which at one end is provided with a projection 8 adapted to enter a cam groove 9 formed around one half of the periphery of the slidable member 50 $n$ of the clutch, one side of this groove by its co-operation with the projection being adapted to effect disengagement of the clutch. The intermediate part of the periphery of the said clutch member $n$ is provided with a cam 10 (see Figures 5-8) adapted to rock the lever 7 about its pivot through a projection 11 for the purpose to be mentioned later. The other end of the lever carries a pawl 12 loaded by a spring 13 adapted to co-operate with a series of appropriately spaced teeth 14 formed on a tappet piece 15 secured to the guide 16 which carries a feed slide $g$.

Referring now more particularly to Figures 5-8, the arrangement is such that during the initial part of the drilling operation, the clutch $n$ is held out of action by the engagement of the projection 8 on the lever 7 with one side of the cam groove 9 in the slidable clutch member $n$. When the drill has penetrated the work piece to a predetermined depth, the pawl 12 on the clutch lever 7 strikes one of the teeth 14 on the tappet piece 15 as shown in Figure 5. This causes the lever 7 to move and withdraw its projection 8 from the clutch member $n$. The latter then engages the complementary clutch member on the worm wheel $k$ under the action of the associated spring, causing the crank disc to be set in motion. During the consequent retraction of the drill, the cam 10 on the slidable clutch member moves the lever 7 in the direction for carrying the pawl 12 clear of the tappet teeth as shown in Figure 6. During the retraction of the drill the pawl 4 associated with the compensating cam $w$ moves into position for actuating this cam. At the end of the first half revolution of the crank the various parts occupy the relative positions shown in Figure 7. During the second half of the rotation of the crank disc, the drill is returned to the working position, the compensating cam is advanced by one notch, and the projection 8 on the clutch lever falls back into the groove 9 on the clutch member $n$ as shown in Figure 8. At the end of one rotation of the crank disc, the clutch lever disengages the clutch, and the drilling then proceeds under the action of the feed slide until the pawl on the clutch lever strikes the next tooth on the tappet piece when the above described action is repeated. The number of repetitions of the said action and the intervals between them, depend on the length of the hole to be produced, and are determined by the number and spacing of the teeth on the tappet piece.

After the completion of the hole the feed slide is returned to its initial position in readiness for action on the next work piece, and as during the previous operation the compensating cam $w$ was moved through only one half a revolution, it is necessary to impart an initial movement to this cam for bringing the second series of notches around the other half of its periphery into operation. To effect this an additional tooth 17 is provided on the tappet piece 15 and suitably spaced from the first of the other teeth, the lever 7 and pawl 12 being in such a position as that shown in Figure 6 while the feed slide is being retracted to its initial position.

In Figure 9, there is illustrated diagrammatically the successive positions of the feed-slide from the moment it is in slow feed to the workpiece surface A—A until the moment it has been rapidly retracted upon completion of drilling then halted in readiness for a similar cycle on another workpiece. The slow feed of the feed-slide occupies the interval $S_1$ to $S_2$ and the rapid retraction $S_2$ to $S_3$. $S_3$ corresponds to $S_1$, that is, the beginning of a repeated similar cycle. Where the feed-slide is in advance of the drill point as a result of successive reliefs of the drill point, the movement of the slide is represented by broken lines. The intervals between the lines drawn parallel to the workpiece surface A—A represent the intervals between the teeth on the tappet piece 15. The points of intersection of these lines with line $S_1S_2$, indicate the moments when the crank mechanism is tripped and the drill point reciprocated to reset its forward position in relation to the feed-slide. The feed-slide movements are superimposed upon those of the drill point.

Considering the drill point at the beginning of a cycle to be at $a_1$ (Figure 9), with the slide in slow feed and the cam $w$ set so that the deepest notch of one set of the notches thereon receives the abutment $x$, the crank mechanism starts to withdraw the drill point to the position $b_1$ at the instant the mechanism on the feed-slide contacts the resetting tooth 17. During the withdrawal, the cam becomes reset so that the shallowest notch of the other set of notches receives the abutment $x$, thus taking up the lag of the drill point behind the slide which accumulated in a previous drilling operation. The crank mechanism returns the drill point from position $b_1$ to present the point to the workpiece surface. Owing to continued feed-slide movement, the drill point is shown carried (downwardly and leftwards in Figure 9) to position $c_1$.

From $c_1$ to $d_1$ drilling occurs, and the feed-slide and drill point are fed in phase without lag. On arriving at $d_1$ the mechanism on the feed-slide contacts tooth $14a$. The crank thereupon reciprocates the drill so that the drill point withdraws to $b_2$ outside the workpiece and is then returned to $c_1$ in the workpiece at the same depth as $d_1$. This depth is the same owing to the further resetting of the cam which occurred during this last reciprocation to bring the notch next in greater depth to effectively subtract from the forward movement derived from the crank the distance by which the feed-slide has advanced during this reciprocation.

The drill point at $c_1$ owing to the reciprocation $d_1 b_2 c_2$ now lags behind the slide by an amount equal to the horizontal distance in the figure from $c_2$ to the broken line $d_1 S_2$.

Drilling again proceeds with the feed-slide ahead of, but in fixed relation to, the drill point as the latter increases depth in the workpiece as indicated by the drilling interval $c_2 d_2$.

Further reciprocations of the drill point with consequential resetting of the cam $w$ to compensate for the interim advance of the continuously advancing feed-slide, take place as indicated by $d_2 b_3 c_3$, $d_3 b_4 c_4$, $d_4 b_5 c_5$ and finally $d_5 b_6 a_2$, when the mechanism on the slide contacts the respective teeth $14b$, $14c$, $14d$, and $14e$.

It will be seen that the total drilling period is the sum of the intervals from the start to the end, namely of $c_1 d_1$, $c_2 d_2$, $c_3 d_3$, $c_4 d_4$ and $c_5 d_5$. The total lag of the drill point behind the feed-slide is represented by the horizontal distance of $S_2$ from $d_5$. The final reciprocation $d_5 b_5 a_2$ of the drill point in the cycle begins when the point $S_2$ is reached by the feed-slide. At that instant the slide is rapidly withdrawn to $S_3$ during which the drill is again reciprocated, its final position being represented by $a_2$. Having been withdrawn to $S_3$ the feed slide occupies the starting position for similar cycle on another workpiece. The position of the drill point $a_2$ corresponds to $a_1$.

By this invention the intermittent withdrawal of the drill for clearing the obstructive cuttings from the drill and applying cooling fluid to the end of the drill, can be effected not only conveniently but in a manner which involves a minimum of loss of time.

Having thus described my invention what I claim as new and desire to secure by Letters Patent is:

1. An automatic drilling unit for mounting upon a tool slide of a machine to which slide continuous uniform uninterrupted feed motion is imparted during the entire drilling operation, comprising in combination a drill holder, a slidably mounted support for said drill holder, mechanism for effecting intermittent reciprocating movements of the drill holder to retract the drill holder from and return it to an operative drilling position, a plurality of stationary means provided on the machine and spaced in the direction of feed, tripping means for initiating successive reciprocatory movements by intermittently co-operating with one of said stationary means, and means operable by said mechanism for varying the operative position of the drill holder to nullify the feed increment imparted by the tool slide during each reciprocation.

2. An automatic drilling unit for mounting upon a tool slide of a machine to which slide continuous uniform uninterrupted feed motion is imparted during the entire drilling operation, comprising in combination a drill holder, a slidably mounted support for the drill holder, a crank mechanism for effecting intermittent reciprocatory movements of the drill holder to retract the drill holder from and return it to an operative drilling position, clutch means adapted to drive the crank mechanism, a plurality of stationary means provided upon the machine and spaced in the direction of feed, tripping means for controlling the clutch means by intermittently co-operating with one of said stationary means, and further means operable by said crank mechanism for varying the operative position of the drill holder to nullify the feed increment imparted by the tool slide during each reciprocation.

3. An automatic drilling unit for mounting upon a tool slide of a machine to which slide continuous uniform uninterrupted feed motion is imparted during the entire drilling operation comprising in combination a drill holder, a slidably mounted support for the drill holder, a crank mechanism for effecting intermittent reciprocating movements of the drill holder to retract the drill holder from and return it to an operative drilling position, clutch means adapted to drive the crank mechanism, a plurality of stationary means provided upon the machine and spaced in the direction of feed, tripping means for controlling the clutch means by intermittently co-operating with one of said stationary means, and a compensatory cam and follower operatively arranged between the crank mechanism and the drill holder which cam is set by said crank mechanism to nullify the feed increment imparted by the tool slide during each reciprocation.

4. An automatic drilling unit as claimed in claim 3, wherein the cam is a rotary disc having a profiled periphery and wherein means are provided for urging the cam and follower into operative engagement.

5. An automatic drilling unit as claimed in claim 3, wherein the crank mechanism comprises a crank disc adapted to receive drive from the clutch means, and a connecting rod pivoted at one end upon the crank disc and operatively connected at its other end to the drill holder by the compensatory cam and follower.

6. An automatic drilling unit as claimed in claim 5, and in combination with a lever pivoted on the drill holder, a ratchet wheel arranged coaxially with and secured to the compensatory cam which is rotatably carried by the lever, an abutment mounted on the drill holder and constituting the follower, spring-means acting on the lever to urge the cam and follower into operative engagement, and a spring-loaded pawl carried by the connecting rod and co-operating with the ratchet wheel for imparting intermittent rotary motion to the cam under the action of the crank disc, each such intermittent motion causing the cam to be reset in readiness for renewed drilling.

7. An automatic drilling unit for mounting upon a tool slide of a machine to which slide continuous uniform uninterrupted feed motion is imparted during the entire drilling operation, comprising in combination a drill holder, a slidably mounted support for the drill holder, a crank mechanism for effecting intermittent reciprocatory movements of the drill holder to retract the drill holder from and return it to an operative drilling position, clutch-means adapted to drive the crank mechanism, a lever for controlling the clutch means, a plurality of stationary means provided upon the machine and spaced in the direction of feed, a spring-loaded actuating pawl mounted on the lever for intermittently co-operating with one of said stationary means, and further means operable by said crank mechanism for varying the operative position of the drill holder to nullify the feed increment imparted to the tool slide during each reciprocation.

HORACE RAY ADCOCK.

References Cited in the file of this patent

UNITED STATES PATENTS

| Number | Name | Date |
|---|---|---|
| 599,356 | Reece | Feb. 26, 1898 |
| 1,748,476 | Hanson | Feb. 25, 1930 |
| 2,460,156 | Vanderhide | Jan. 25, 1949 |